No. 766,815.                                                    Patented August 9, 1904.

UNITED STATES PATENT OFFICE.

THOMAS A. EDISON, OF LLEWELLYN PARK, NEW JERSEY, ASSIGNOR TO EDISON MANUFACTURING COMPANY, OF ORANGE, NEW JERSEY, A CORPORATION OF NEW JERSEY.

PRIMARY BATTERY.

SPECIFICATION forming part of Letters Patent No. 766,815, dated August 9, 1904.

Application filed November 18, 1903. Serial No. 181,591. (No model.)

*To all whom it may concern:*

Be it known that I, THOMAS ALVA EDISON, of Llewellyn Park, Orange, in the county of Essex and State of New Jersey, have invented certain Improvements for Primary Batteries, of which the following is a description.

My invention relates to the manufacture of copper-oxid electrodes for primary batteries, preferably of the Lalande type, wherein copper oxid is opposed to metallic zinc in an alkaline solution.

The object of my invention is to produce a copper-oxid electrode of superior quality and at a moderate cost.

In the use of batteries of the Lalande type on discharge the copper oxid is reduced to the metallic state and the zinc oxidized. The cell does not reach its normal discharge rate until the surface of the negative electrode is completely reduced to the metallic state, so that it is the practice in the art to preliminarily reduce the surface of these electrodes before assembling them, so as to save the time required to effect this reduction in the cell itself. I find that very good results can be secured by dispensing with the preliminary reduction of the copper oxid and substituting therefor a treatment with ordinary red oxid of copper applied in any suitable way—as, for example, of rubbing the red oxid on the surface of the electrode. The electrode is more or less porous, so that the particles of red oxid adhere very tenaciously to the surface. A copper-oxid electrode so treated when properly connected up in a cell gives a very satisfactory discharge rate, and since the red oxid is readily reducible the surface reduction to the metallic state progresses rapidly, so that the cell quickly reaches its full discharge rate. The copper-oxid electrodes which are thus treated can be obtained in any way; but I prefer to make them by treating precipitated hydroxid of copper with hypochlorite of sodium, thereby producing an excessively finely divided black oxid of copper, which is then dried, moistened with a solution of sodium, and pressed into plates of the desired form and burned in the regular manner to consolidate the mass. I find that copper-oxid plates obtained in this way produce better results than when the oxid is obtained by other processes and is less finely divided.

Having now described my invention, what I claim as new, and desire to secure by Letters Patent, is as follows:

1. A negative electrode for primary batteries employing a compressed mass of black oxid of copper in excessively finely divided condition, substantially as set forth.

2. A negative electrode for primary batteries comprising a compressed mass of black oxid of copper, carrying a film of red oxid of copper on its surface, substantially as set forth.

3. A negative electrode for primary batteries comprising a porous compressed mass of black oxid of copper and finely-divided red oxid of copper applied to the porous surface, substantially as set forth.

This specification signed and witnessed this 16th day of November, 1903.

THOMAS A. EDISON.

Witnesses:
FRANK L. DYER,
HARRY G. WALTERS.